US009396622B2

United States Patent

Van Nest et al.

(10) Patent No.: US 9,396,622 B2
(45) Date of Patent: Jul. 19, 2016

(54) ELECTRONIC ARTICLE SURVEILLANCE TAGGED ITEM VALIDATION PRIOR TO DEACTIVATION

(71) Applicant: Sensormatic Electronics, LLC, Boca Raton, FL (US)

(72) Inventors: Nancy Lee Van Nest, Delray Beach, FL (US); Stewart E. Hall, Wellington, FL (US); Hubert A. Patterson, Boca Raton, FL (US); William M. Farrell, West Palm Beach, FL (US); Paul Brent Rasband, Lantana, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 744 days.

(21) Appl. No.: 13/667,688

(22) Filed: Nov. 2, 2012

(65) Prior Publication Data

US 2014/0125800 A1 May 8, 2014

(51) Int. Cl.

| | |
|---|---|
| ***H04N 7/18*** | (2006.01) |
| ***G07G 3/00*** | (2006.01) |
| ***G08B 13/24*** | (2006.01) |

(52) U.S. Cl.

CPC .............. *G07G 3/003* (2013.01); *G08B 13/246* (2013.01)

(58) Field of Classification Search

None

See application file for complete search history.

(56) References Cited

U.S. PATENT DOCUMENTS

| | | | | |
|---|---|---|---|---|
| 6,497,361 | B1 * | 12/2002 | Mason | 235/383 |
| 8,006,904 | B2 * | 8/2011 | Salim et al. | 235/385 |
| 8,489,065 | B2 * | 7/2013 | Green et al. | 455/404.1 |
| 2012/0055982 | A1 | 3/2012 | Edwards | |
| 2012/0286031 | A1 * | 11/2012 | Rothschild | G06K 19/06056 235/375 |

* cited by examiner

*Primary Examiner* — Heather Jones

(74) *Attorney, Agent, or Firm* — Alan M. Weisberg; Christopher & Weisberg, P.A.

(57) ABSTRACT

A method and system for activating an EAS element deactivator is provided. At a computer, item data including a physical attribute of an item is received. A determination is made as to whether the item data corresponds to a purchased item in a purchase receipt. When it is determined that the item data corresponds to the purchased item, EAS element deactivator is activated for use.

18 Claims, 9 Drawing Sheets

ELECTRONIC ARTICLE SURVEILLANCE TAGGED ITEM VALIDATION PRIOR TO DEACTIVATION

TECHNICAL FIELD

The present invention relates to deactivation of security tags, such as an Electronic Article Surveillance ("EAS") element, and in particular to a method and system for activating an EAS element deactivator.

BACKGROUND

A typical retail sales transaction occurs at a fixed point of sale ("POS") station manned by a store sales associate. The store sales associate assists a customer with the checkout process by receiving payment for an item. If the item is associated with an EAS element, such as an acousto-magnetic ("A-M") tag, the store sales associate deactivates the EAS element after the customer pays for the item. During the transaction, the store sales associate has the opportunity to visually inspect the item and notice whether the item has a price tag with a suspiciously low price.

An item may have a price tag with an unusual low price because the customer has fraudulently switched price tags by replacing the original price tag with a low price tag corresponding to a less expensive item. By noticing the inconsistent price tag, the store sales associate has the opportunity to prevent the fraud and determine the correct price of the item.

While traditional POS stations are advantageous in that they allow a store sales associate to supervise the checkout transaction, in order to control costs, many retailers have implemented self-checkout POS stations that allow a customer to self-checkout. A self-checkout station is not supervised by a store sales associate. In a self-checkout transaction, the customer independently rings up the sale of an item. If the item is associated with an EAS element, a store sales associate deactivates the EAS element attached to the item.

Allowing the customer to self-checkout may be risky. For instance, a customer may wish to buy an expensive item but may not want to pay the full price. The customer may switch the price tag on the expensive item with a much less expensive price tag. The customer may then use a self-checkout POS station to pay. After payment is completed, a store sales associate may use an EAS element deactivator tool to deactivate the EAS element associated with the item. Once the EAS element is deactivated, the customer leaves the store without having paid the full price for the item.

Similarly, if the retail store does not offer a self-checkout POS station, the customer may use a traditional POS station to purchase the item. The store sales associate supervising the transaction at the traditional POS station could be in collusion with the customer and the switched price tag will be intentionally overlooked by the store sales associate, i.e., sweethearting. The store sales associate deactivates the EAS element and the customer leaves the store without having paid the full price for the item.

SUMMARY

The present invention advantageously provides a method and system for activating an EAS element deactivator. In accordance with one aspect, a method for activating an EAS element deactivator is provided. Item data including a physical attribute of an item is received at a computer. A determination is made as to whether the item data corresponds to a purchased item in a purchase receipt. When it is determined that the item data corresponds to the purchased item, the EAS element deactivator is activated for use.

In accordance with another aspect, a method for activating an EAS element deactivator includes receiving a manufacturer code of an item. The item is associated with a tag. Tag data is received from the tag. The manufacturer code is compared with the tag data using a computer. A determination is made, based at least in part on the comparison of the manufacturer code with the tag data, as to whether the tag corresponds to the item. If it is determined that the tag corresponds to the item, then the EAS element deactivator is activated for use.

In accordance with yet another aspect, a method for activating an EAS element deactivator, includes determining that an item was removed by a customer from a location in a retail store. The item is associated with a tag including tag data. The item is identified based at least in part on the location where the item was removed from. The item is associated with the customer. A determination is made as to whether the tag data corresponds to the item. If the tag data corresponds to the item, then the EAS element deactivator is activated for use.

In accordance with yet another aspect, a computer for activating an EAS element deactivator includes a transmitter, a receiver and a processor in communication with each other. The receiver is configured to receive item data including a physical attribute of an item. The processor is configured to determine whether the item data corresponds to a purchased item in a purchase receipt. When the processor determines that the item data corresponds to the purchased item, the transmitter is configured to transmit an activation signal to activate the EAS element deactivator.

In accordance with yet another aspect, a computer for activating an EAS element deactivator includes a transmitter, a receiver and a processor in communication with each other. The receiver is configured to receive a manufacturer code of an item, the item being associated with a tag. The receiver is further configured to receive tag data from the tag. The processor is configured to compare the manufacturer code with the tag data. A determination is made, based at least in part on the comparison of the manufacturer code with the tag data, as to whether the tag data corresponds to the item. If the processor determines that the tag data corresponds to the item, then the transmitter is configured to transmit an activation signal to activate the EAS element deactivator for use.

In accordance with yet another aspect, a system for activating an EAS element deactivator includes a computer. The computer has a processor configured to determine that an item was removed by a customer from a location in a retail store, the item being associated with a tag including tag data. The processor is further configured to identify the item based at least in part on the location where the item was removed from. The processor is further configured to associate the item with the customer and determine whether the tag data corresponds to the item. If the processor determines that the tag data corresponds to the item, then the transmitter is further configured to transmit an activation signal to activate the EAS element deactivator for use.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
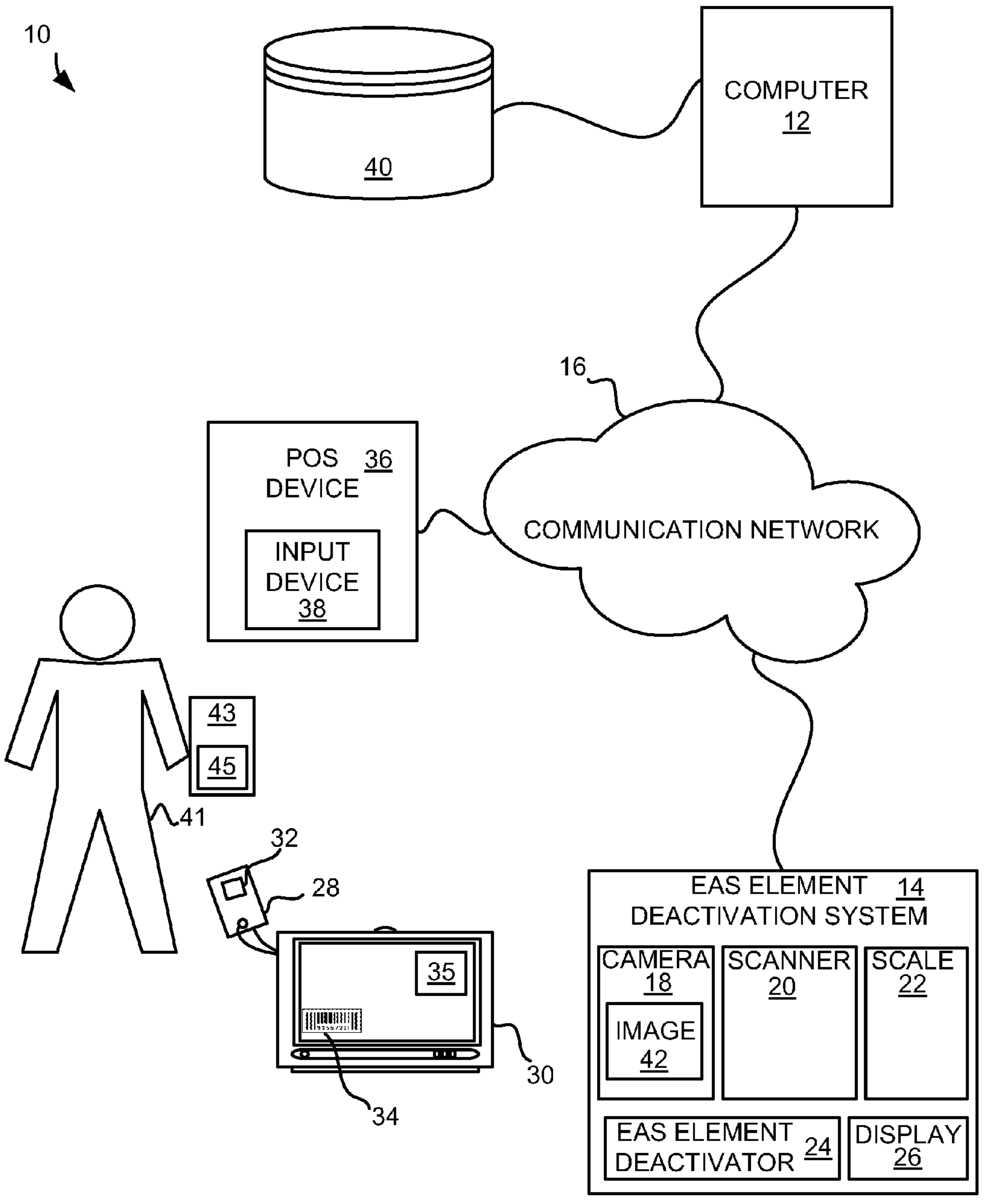
FIG. 1 is a block diagram of an exemplary EAS element deactivation system in accordance with the principles of the present invention.

Embodiments of the present invention provide a method and system for activating an EAS element deactivator. In accordance with an embodiment of the present invention, item data including a physical attribute of an item is received at a computer. A determination is made as to whether the item data corresponds to a purchased item in a purchase receipt. When it is determined that the item data corresponds to the purchased item, the EAS element deactivator is activated for use.

Before describing in detail exemplary embodiments that are in accordance with the present invention, it is noted that the embodiments reside primarily in combinations of apparatus components and processing steps related to implementing a method, system and a computer for activating an EAS element deactivator. Accordingly, the method, system, and computer components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a diagram of an exemplary system constructed in accordance with the principles of the present invention and designated generally as "10." System 10 includes computer 12 in communication with EAS element deactivation system 14 via communication network 16. EAS element deactivation system 14 may be a deactivation kiosk, a locked cabinet or a dedicated self-checkout location in a retail store. EAS element deactivation system 14 may include camera 18, scanner 20, scale 22, EAS element deactivator 24 and display 26. Tag 28 is associated with item 30 and includes tag data 32. Item 30 may be further associated with manufacturer code 34, e.g., a barcode, and with a security tag, such as EAS element 35. EAS element deactivation system 14 may be used to deactivate EAS element 35, which may be a security tag associated with item 30.

Point of sale device 36 communicates with computer 12 and EAS element deactivation system 14 via communication network 16. POS device 36 may be a self-checkout POS and may include input device 38. POS device 36 may be a fixed or a mobile POS device 36, such as a wireless mobile device. Computer 12 stores or is in communication with item database 40, which includes item data corresponding to items offered for sale in the retail store. Computer 12 may be part of EAS element deactivation system 14 and vice-versa.

In an exemplary embodiment, POS device 36 may be owned by the retail store, may be equipment used by the retail store, such as leased equipment, or may be a mobile device, smart phone or tablet that belongs to customer 41. For example, POS device 36 may include a retailer application that communicates with a retailer database or a retailer computer, such as computer 12. The mobile device, smart phone or tablet may communicate to computer 12 in order to scan tag 28, enter payment details, and tender the purchase transaction of an item. The retailer application may communicate with a retailer's backend software. The backend software of the retailer may confirm that the sales transaction is complete and issues a signal to EAS element deactivator 24.

Communication network 16 may include a cellular communication network and the Public Switched Telephone Network ("PSTN"), an internet protocol ("IP") network that may be established as a wide area network ("WAN") and/or local area network ("LAN"), such as an Ethernet LAN, among other IP-based networks. Communication network 16 may be a wireless network, such as Wi-Fi, satellite, infrared, Bluetooth, Ultra Wide Band ("UWB"), Zigbee, Wireless Personal Area Network ("WPAN"), or other communication network. Computer 12 and EAS element deactivation system 14 may be connected via communication network 16 to other computers, such as computers associated with a merchandise supplier, a computer storing database 40, or any other third party (not shown) located on the retail store premises or at some other location accessible through the Internet or World-Wide-Web.

Tag 28 and EAS element 35 may be associated with item 30, such as by being affixed or removably affixed to item 30. EAS element 35 may be a standalone or integrated into hardware such as an electronic price tag 28, i.e., EAS element 35 may be integrated as part of tag 28. EAS element 35 is usually fixed to merchandise or books, such as item 30. EAS element 35 is removed or deactivated by the store sales associate when item 30 is properly bought or checked out. At the exits of the retail store, a detection system sounds an alarm or otherwise alerts a retail associated when the detection system senses an active EAS element 35 that has not been properly deactivated.

EAS element 35 may be an acousto-magnetic element made of a strip of metal. Detection of EAS element 35 is achieved by sensing harmonics and signals generated by the magnetic response of EAS element 35 when exposed to a magnetic field. EAS element 35 may be demagnetized so it may no longer produce harmonic signals. In radio-frequency systems, EAS element 35 may include a circuit with a capacitor and an inductor. The circuit may have a resonance peak. To deactivate EAS element 35, EAS element 35 may be exposed to a strong electromagnetic field that induces a voltage exceeding the capacitor's voltage, hence destroying the capacitor. EAS element 35 may be imprinted with a code, such as a barcode.

Tag 28 may also be associated with objects and/or fixture (s) in the retail store, such as a shelf or display. Tag 28 may be a price tag, including an RFID tag configured to transmit an RFID signal in response to a received RFID interrogation signal, among other types of tags. Tag 28 may include a transmitter, such as an NFC transmitter, a receiver, such as an NFC receiver, and a memory for storing tag data 32. Alternatively, tag data 32 may be printed on tag 28.

Tag data 32 may include optically readable data such as a stock-keeping unit ("SKU"), quick response ("QR") code, universal product code ("UPC") and other optically readable codes. For instance, tag data 32 may include an optical 1-dimensional or 2-dimensional barcode that can be scanned by scanner 20 and input device 38, which may be, for example, a barcode scanning application or a barcode scanning device, e.g., an optical scanner. Tag data 32 may include numbers, letters, symbols, a combination of these, or any other types of code.

Tag 28 may be configurable, i.e., tag 28 is programmable. In particular, tag 28 may be programmed wirelessly by computer 12 using wireless sensor protocols or using other tag programming methods known in the art. Since tag 28 may receive and transmit signals, in-store communication network 16 may communicate with tag 28 to update tag data 32.

Figure 4:
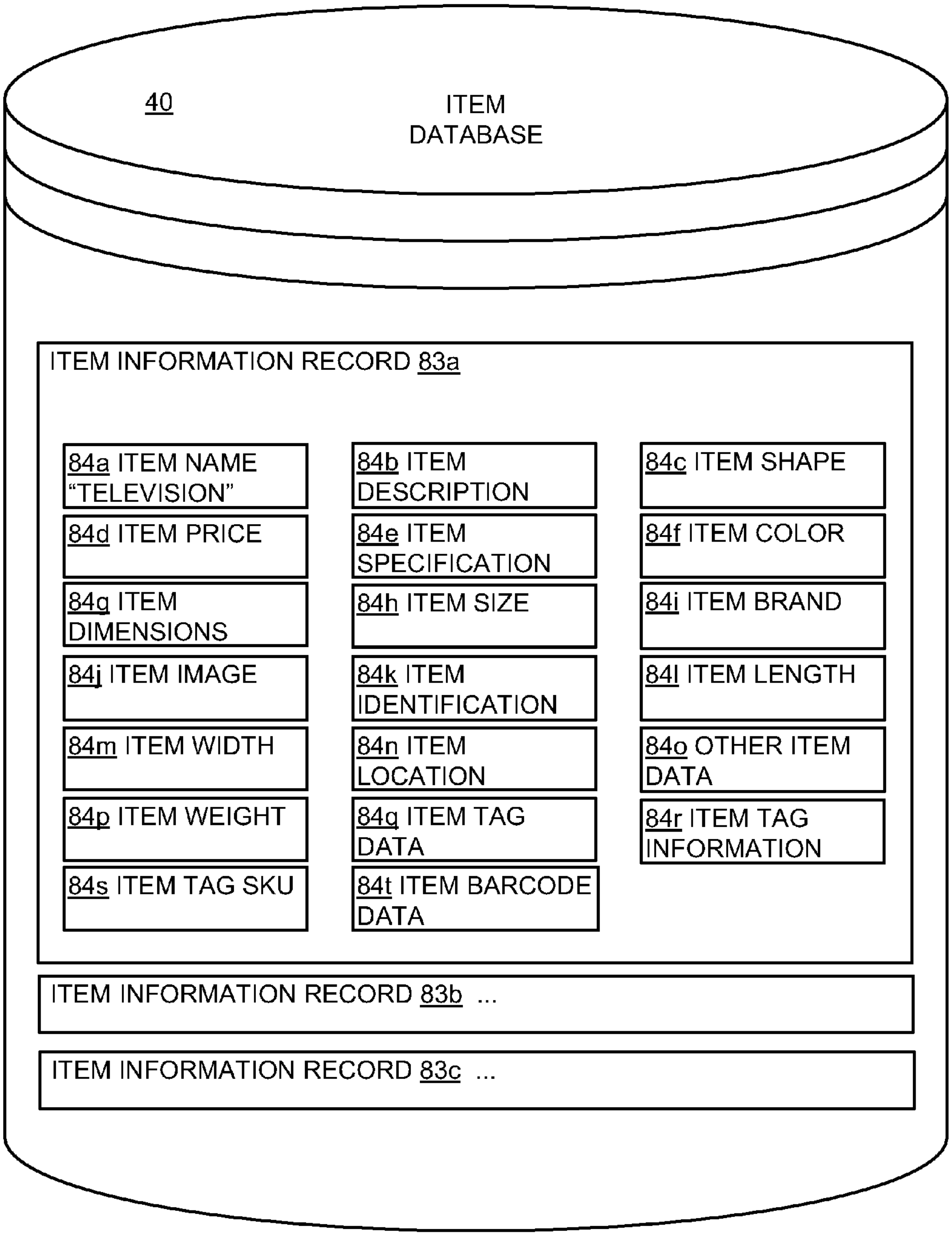
FIG. 4 is a block diagram of an exemplary item database constructed in accordance with the principles of the present invention.

Tag data 32 may include any data associated with item 30. For example, tag data 32 may include data stored in item database 40 (item database 40 is shown in FIG. 4), such as item name 84*a*, item description 84*b*, item shape 84*c*, item price 84*d*, item specifications 84*e*, item color 84*f*, item dimensions 84*g*, item size 84*h*, item brand 84*i*, item identification 84*k*, other item data 84*o*, item weight 84*p*, item tag data 84*q*, item tag information 84*r*, item tag SKU 84*s*, and item barcode data 84*t*, such as item barcode data from barcode 34.

In an exemplary embodiment, a purchased item is validated using computer 12. For example, computer 12 may use the size, shape, dimension or image of the item to match the scanned price and product description of the item. Tag 28 may include the price, which may be scanned using POS device 36. Additionally, tag 28 may include data that includes the product description of an item, or data that can be used by computer 12 to obtain the product description of an item. In another exemplary embodiment, computer 12 may validate a purchased item using a photo image. EAS element deactivation system 14 may be equipped with low-cost video camera 18. Customer 41 may present the item for deactivation and camera 18 captures an image of the item. The image may be matched in a store inventory database. Computer 12 makes a determination as to whether the item corresponds to the image in the database, and to purchased item 45 in purchase receipt 43.

In accordance with another aspect, a method for activating an EAS element deactivator 24 includes receiving the weight of an item from scale 22. The item is associated with an item weight stored in computer 12 (the item weight may be stored in a database). The weight of the item received from scale 22 is compared with the item weight stored in computer 12. Computer 12 makes a determination, based at least on the comparison of the weight with the item product identification or tag data 32, as to whether the weight corresponds to the item presented for deactivation. If, based at least on an analysis of tag data 32 and the weight of the item, it is determined that tag 28 corresponds to the item presented for deactivation, then EAS element deactivator 24 is activated for use. Scale 22 may be a solenoid type weight scale.

In accordance with another embodiment, a retailer's building is equipped with video surveillance devices, such as video cameras. A video camera identifies an item being pulled from a shelf at a retail store by customer 41, based at least on the location of the item in the retail store and the shelf. Computer 12 may store a database that may be used to recognize products based on the location of the product. As customer 41, e.g., a shopper, scans tag 28 corresponding to an item, the price and image of the item are validated.

In an exemplary embodiment, customer 41 may use self-checkout POS device 36 to pay for an item. Customer 41 may use input device 38, e.g., a scanner, to scan tag 28 associated with item 30. In one embodiment, item 30 is a television. Customer 41 may enter payment information using POS device 36. POS device 36 may receive tag data 32 and payment information. Tag data 32 and the payment information may be transmitted by POS device 36 to computer 12. In response to receiving tag data 32 and the payment information, computer 12 may send to POS device 36 a confirmation that the item has been purchased. Payment confirmation may include purchase receipt 43, which may be a paper receipt or an e-receipt. The e-receipt may be displayed at a display of POS device 36, which may be a mobile device owned by the merchant or customer 41. Purchase receipt 43 includes purchased item 45. In this example, purchased item 45 is item 30 since item 30 has the correct tag 28. However, if item 30 has an incorrect tag, for example, a tag corresponding to a baseball, purchased item 45 will not be item 30, but the baseball.

Customer 41 approaches EAS element deactivation system 14 in order to deactivate EAS element 35 associated with item 30. When customer 41 presents item 30 including EAS element 35 for deactivation, camera 18 captures image 42 of item 30. To determine whether purchased item 45 is item 30, EAS element deactivation system 14 sends image 42 for analysis to computer 12. Computer 12 analyzes image 42 using visual recognition techniques to determine whether image 42 corresponds to purchased item 45 in purchased receipt 43. Computer 12 examines purchase receipt 43, which includes tag data 32, to ascertain whether purchase receipt 43 indicates that the purchased item 45 is item 30 in image 42. As such, computer 12 verifies that item 30 shown in image 42 matches purchased item 45 in purchase receipt 43.

If computer 12 determines that image 42 corresponds to purchased item 45 shown in purchase receipt 43, then computer 12 activates EAS element deactivator 24. Customer 41 may then use EAS element deactivator 24 to deactivate EAS element 35. Else, if computer 12 determines that image 42 does not correspond to purchased item 45 in purchase receipt 43, then computer 12 may send a message using communication network 16 to a store sales associate. The message may indicate that a customer tried to deactivate security EAS element 35 associated with item 30 but item 30, does not match or correspond to purchased item 45 in purchase receipt 43.

Figure 2:
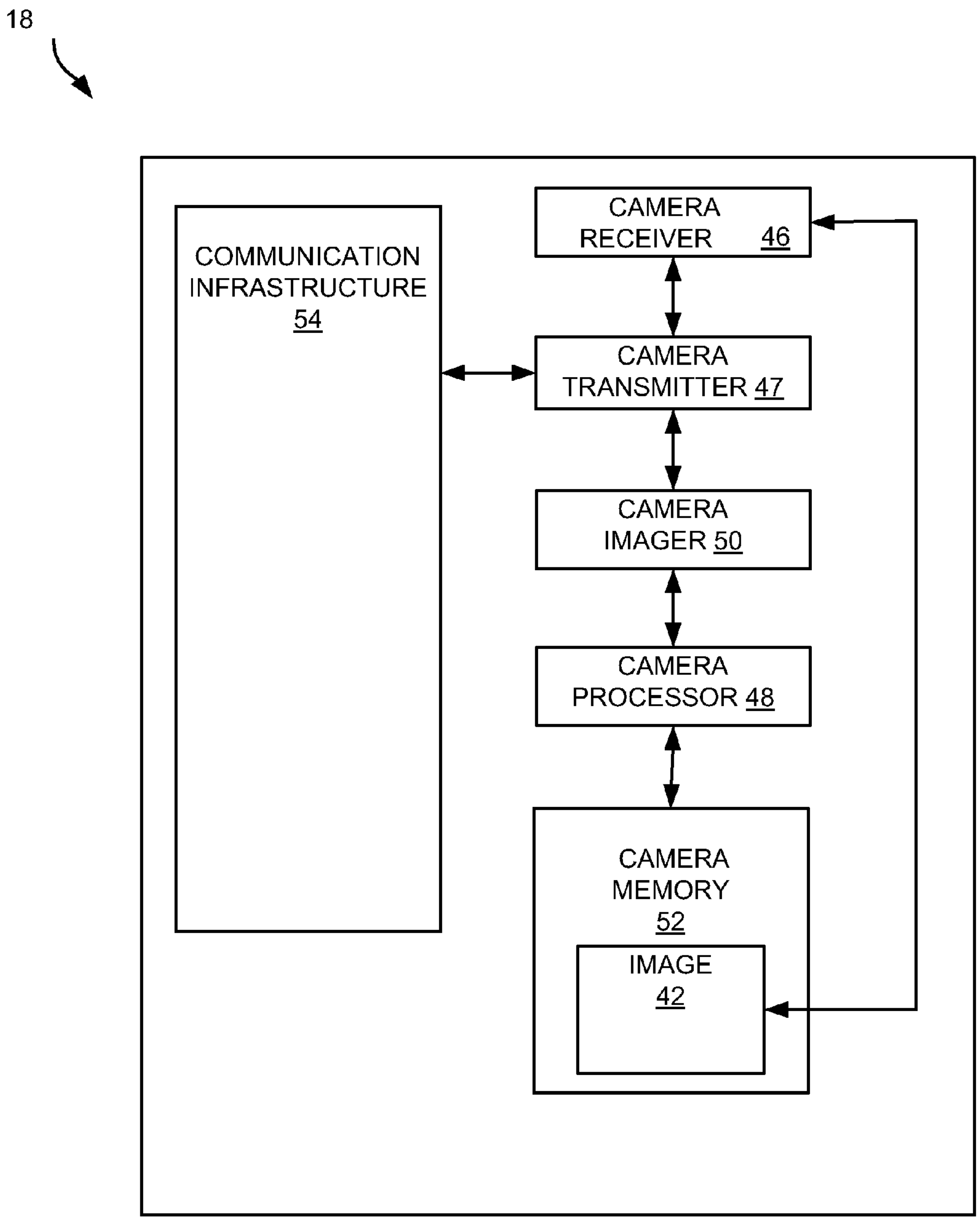
FIG. 2 is a block diagram of an exemplary camera constructed in accordance with the principles of the present invention.

FIG. 2 is a block diagram of an exemplary camera 18. Camera 18 of EAS element deactivation system 14 may be a low cost video camera configured to capture the shape, size, dimensions and any other physical characteristics of item 30. Camera 18 may include camera receiver 46, camera transmitter 47, camera processor 48, camera imager 50 and camera memory 52. In one embodiment, these components communicate with each other directly, and camera transmitter 47 is in communication with the infrastructure 54. It is understood that the interconnection of components is not limited to the arrangement shown in FIG. 2. For example more than one of the components can be interconnected to, and communicate via, communication infrastructure 54. Camera imager 50 is configured to capture image 42 of item 30. Camera receiver 46 is configured to receive image 42. Image 42 is stored in camera memory 52. Camera transmitter 47 is configured to transmit image 42 to computer 12 for visual image analysis.

Figure 3:
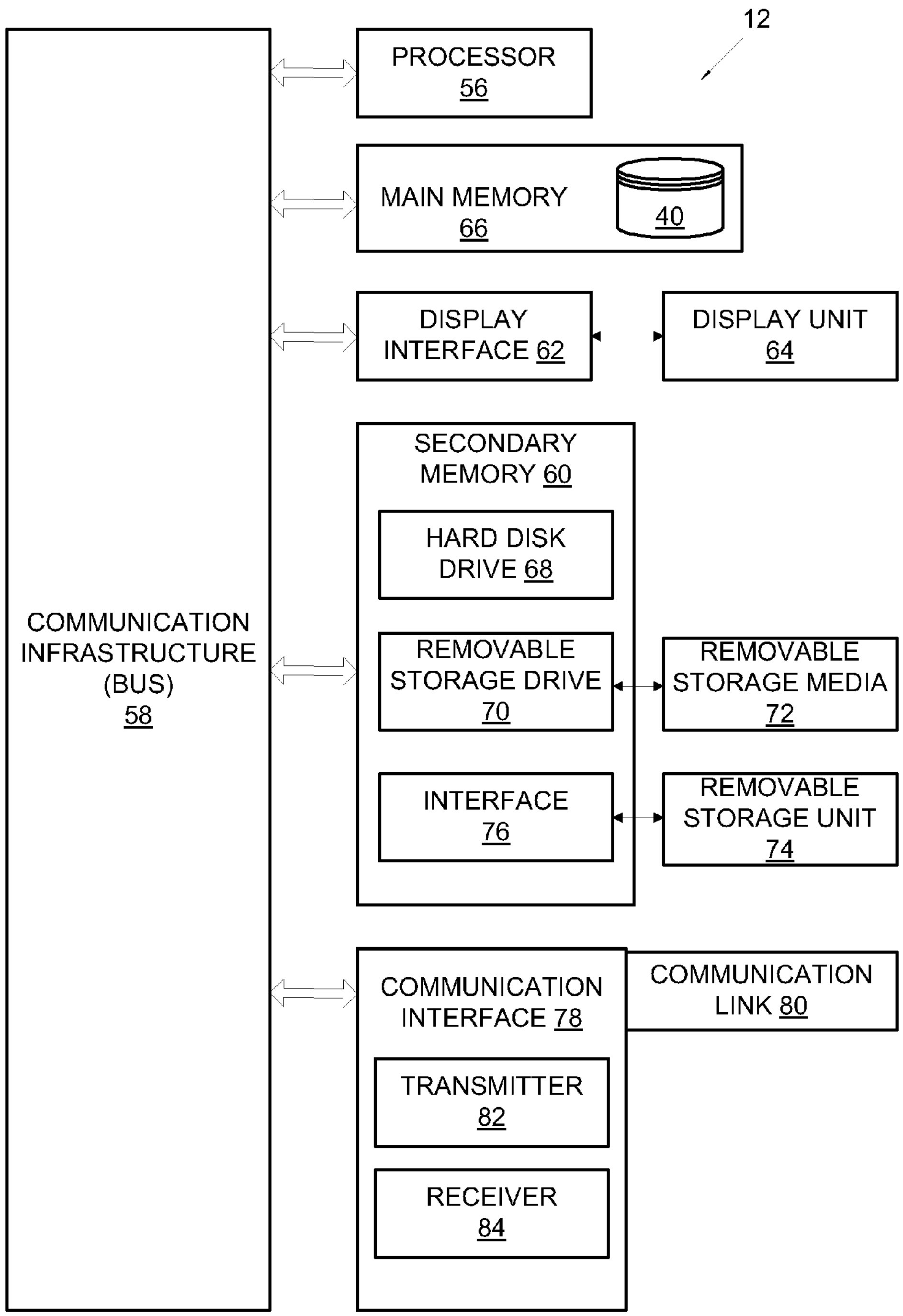
FIG. 3 is a block diagram of an exemplary computer constructed in accordance with the principles of the present invention.

FIG. 3 is a block diagram of an exemplary computer 12, which could be a computer located at the retail store, or at a remote location. Computer 12 includes one or more processors, such as processor 56 programmed to perform the functions described herein. Processor 56 is operatively coupled to a communication infrastructure 58, e.g., a communications bus, cross-bar interconnect, network, etc. Processor 56 may execute computer programs stored on disk storage for execution via secondary memory 60. Processor 56 may be configured to perform image analysis to extract meaningful information from a photograph, i.e., image 42 of item 30. Processor 56 may analyze image 42 using image processing techniques. For example, processor 56 may identify item 30 in image 42 using techniques such as pattern recognition, digital geometry, 2D/3D object recognition, image segmentation, motion detection, particle tracking, video tracking, optical flow, and signal processing, among other image recognition techniques.

Additionally, processor 56 may extract quantitative information from image 42 using geometry. Processor 56 may process image 42 to extract image data including physical features of item 30. Image data extracted may be used to identify, describe, interpret and evaluate image 42. Processor 56 may analyze image 42 to obtain useful information and image data from image 42. Processor 56 may be configured to recognize shapes in image 42 and use algorithms to measure, for example, the size of the shapes, determine the morphology of the shapes and the general structure of item 30. Processor 56 may also determine physical characteristics of image 42, such as a length, height, width, color, size, shape, texture, dimension, etc. of item 30. Image data obtained from image 42 may be exported and stored in item database 40. Likewise, image 42 may be stored in item database 40.

Computer 12 may optionally include or share a display interface 62 that forwards graphics, text, and other data from the communication infrastructure 58 (or from a frame buffer not shown) for display on display unit 64. Display unit 64 may be a cathode ray tube (CRT) display, a liquid crystal display (LCD), a plasma display, a light-emitting diode (LED) display or touch screen display, among other types of displays.

Computer 12 also includes a main memory 66, such as random access memory ("RAM") and read only memory ("ROM"). Secondary memory 60 may include, for example, a hard disk drive 68 and/or a removable storage drive 70, representing a removable hard disk drive, magnetic tape drive, an optical disk drive, etc. The removable storage drive 70 reads from and/or writes to a removable storage media 72 in a manner well known to those having ordinary skill in the art. Removable storage media 72, represents, for example, a floppy disk, external hard disk, magnetic tape, optical disk, etc. which is read by and written to by removable storage drive 70. As will be appreciated, the removable storage media 72 includes a computer usable storage medium having stored therein computer software and/or data.

In alternative embodiments, secondary memory 60 may include other similar devices for allowing computer programs or other instructions to be loaded into the computer system and for storing data. Such devices may include, for example, a removable storage unit 74 and an interface 76. Examples of such may include a program cartridge and cartridge interface (such as that found in video game devices), flash memory, a removable memory chip (such as an EPROM, EEPROM or PROM) and associated socket, and other removable storage units 74 and interfaces 76 which allow software and data to be transferred from the removable storage unit 74 to other devices.

Computer 12 may also include a communications interface 78. Communications interface 78 allows software and data to be transferred to external devices. Examples of communications interface 78 may include a modem, a network interface (such as an Ethernet card), a communications port, a PCMCIA slot and card, a wireless transceiver/antenna, etc. Communication interface 78 may include transmitter 82 and receiver 84. Software and data transferred via communications interface/module 78 may be, for example, electronic, electromagnetic, optical, or other signals capable of being received by communications interface 78. These signals are provided to communications interface 78 via the communications link (i.e., channel) 80. Channel 80 carries signals and may be implemented using wire or cable, fiber optics, a phone line, a cellular phone link, an RF link, and/or other communications channels.

It is understood that computer 12 may have more than one set of communication interface 78 and communication link 80. For example, computer 12 may have a communication interface 78/communication link 80 pair to establish a communication zone for wireless communication, a second communication interface 78/communication link 80 pair for low speed, e.g., WLAN, wireless communication, another communication interface 78/communication link 80 pair for communication with low speed wireless networks, and still another communication interface 78/communication link 80 pair for other communication.

Computer programs (also called computer control logic) are stored in main memory 66 and/or secondary memory 60. For example, computer programs are stored on disk storage, i.e., secondary memory 60, for execution by processor 56 via RAM, i.e. main memory 66. Computer programs may also be received via communications interface 78. Such computer programs, when executed, enable the method and system to perform the features of the present invention as discussed herein. In particular, the computer programs, when executed, enable processor 56 to perform the features of the corresponding method and system. Accordingly, such computer programs represent controllers of the corresponding device.

Although a single computer 12 is mentioned, the present invention is not limited to such. It is contemplated that more than one computer 12 can be implemented. Therefore, computer 12 functionality may be performed by a single computer or distributed among multiple computers or computing devices. For example, computer 12 functionality may be performed by an in-store or off-site computer 12. Alternatively, computer 12 functionality may be performed by several computing devices that may be located in the same general location or different locations, e.g., cloud computing. In other words, each computing device may perform one or more particular sub-processes of computer 12. As such, computer 12 may be a system of components that functions collectively to receive, process and analyze image 42.

Various software embodiments are described in terms of this exemplary computer system. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device. For example, configuration and management of computer 12 may be designed to occur remotely by web browser. In such case, the inclusion of display interface 62 and display unit 64 may not be required. Even though computer 12 is described herein as comprising hardware devices, computer 12 may be implemented in software executed in a cloud server infrastructure.

Computer 12 may include or may be in communication with item database 40. Item database 40 may be stored in main memory 66, an external storage device, or in another computer in communication with computer 12 (not shown). Item database 40 may include data that may be relevant to the determination of whether item data, such as a weight or image 42, corresponds to purchased item 45. Of note, although item data is described as being stored in a database, the invention is not limited to such, and other data structures may be used to store data. For example, data may be stored in a text file or a hash table.

FIG. 4 is a block diagram of an exemplary item database 40. Item database 40 may be a corporate or store inventory database that stores information on items for sale in the retail store. Item database 40 may include multiple item information records, each item information record corresponding to an item for sale, such as exemplary item information record 83*a*, which stores information related to item 30. Item database 40 also includes other exemplary item information records, such as, item information record 83*b*, which stores information about another item, and item information record 83*c*, which stores information on yet another item. Although only three item information records 83*a*, 83*b* and 83*c* are shown in FIG. 4, the invention is not limited to such. Item database 40 may store any number of item information records. Further, even though FIG. 4 shows exemplary item information record 83*a* in expanded form, but not item information records 83*b* and 83*c* in expanded form, each item information record stored in item database 40, such as item information records 83*b* and 83*c*, may include the same or similar information stored in item information record 83*a*.

Item information record 83*a* may store any type of information related to item 30. For example, item information record 83*a* may include, but not be limited to an item name 84*a*, item description 84*b*, item shape 84*c*, item price 84*d*, item specifications 84*e*, item color 84*f*, item dimensions 84*g*, item size 84*h*, item brand 84*i*, item image 84*j*, item identification 84*k*, item length 84*l*, item width 84*m*, item location 84*n*, other item data 84*o*, item weight 84*p*, item tag data 84*q*, item tag information 84*r*, item tag SKU 84*s* and item barcode data 84*t*. Item information record 83*a* may also store images, such as image 42, of items available for sale, measurements of item 30, a size of a packing box associated with item 30, etc. Additionally, item database 40 may include an item model and other item physical characteristics. Item database 40 may be associated with a vendor and may be stored in a vendor computer that communicates with computer 12 via communication network 16.

Figure 5:
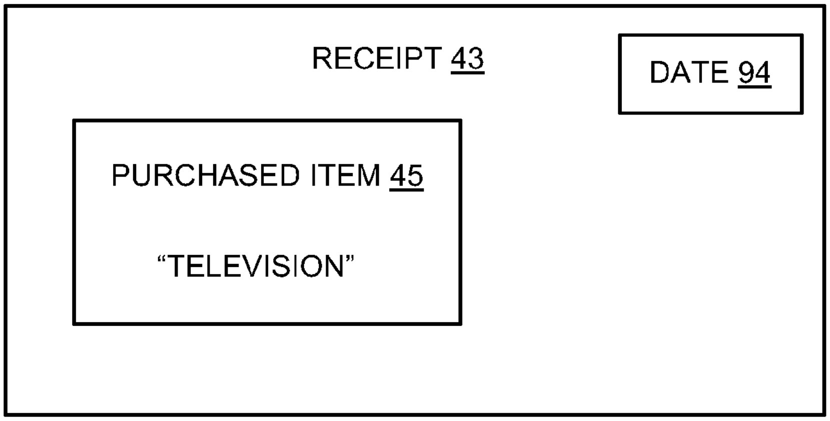
FIG. 5 is a block diagram of an exemplary purchase receipt constructed in accordance with the principles of the present invention.

FIG. 5 is a block diagram of an exemplary purchase receipt 43, which may be an e-receipt transmitted by computer 12 to POS device 36. Purchase receipt 43 may include purchased item 45 and date of purchase 94. Purchased item 45 may include any data corresponding to a purchased item, including but not limited to, tag data 32, item name 84*a*, item description 84*b*, item identification 84*k*, item tag data 84*q*, item tag information 84*r*, item tag SKU 84*s* and/or item barcode data 84*t*. For example, purchase receipt 43 in FIG. 5 may include "TELEVISION" as purchased item 45.

In an exemplary embodiment, a retailer may wish to control the use of EAS elements deactivation tools, such as EAS element deactivation system 14, to prevent the unauthorized use of EAS element deactivation system 14 to deactivate EAS element 35. A customer may pay for item 30 using mobile or fixed POS device 36. Customer 41 may scan tag 28, associated with item 30, using self-checkout POS device 36. POS device 36 receives tag data 32, which may include a purchase price. POS device 36 transmits tag data 32 to computer 12.

Customer 41 may choose to pay for item 30 using, for example, a credit card. POS device 36 receives and transmits payment information to computer 12. In response, computer 12 may verify tag data 32 and payment information. Computer 12 may send purchase receipt 43 to POS device 36 as a proof of purchase. Purchased item 45 in purchase receipt 43 may identify, i.e., include item 30, which in this example is a television. Once customer 41 has paid, customer 41 approaches EAS element deactivation system 14 to deactivate EAS element 35 associated with item 30.

EAS element deactivation system 14 is used to validate item 30 before deactivating EAS element 35 associated with item 30. EAS element deactivation system 14 ensures that item 30 has been paid for prior to activating EAS element deactivator 24 to allow deactivation of EAS element 35 by obtaining item data including a physical attribute of purchased item 30. Item data may include an image 42 of item 30 and a weight of item 30, among others.

In an exemplary embodiment, item data includes image 42 of item 30. Camera 18 captures image 42 and transfers the item data, e.g., image 42, to computer 12 for visual analysis. Computer 12 receives the item data and analyzes image 42 to determine which item is shown in image 42. Computer 12 may also determine image data from image 42, such as physical characteristics of the item shown in image 42, e.g., length, height, width, color, size, shape, texture, dimensions, etc. Further, computer 12 may analyze image data to determine the item in image 42.

Item data, e.g., image 42 and/or image data obtained from image 42, may correspond to an item associated with an item information record in item database 40. Computer 12 may use visual analysis to match an item to image 42, i.e., to determine an item in item database 40 that matches image 42. By way of example, computer 12 may determine that the item matching image 42 is item 30, e.g., a television, associated with item information record 83*a*.

As such, computer 12 examines purchase receipt 43 to determine whether purchased item 45 is a television. If purchased item 45 matches the determined item 30, computer 12 sends an activation signal to EAS element deactivator 24. Customer 41 may then use EAS element deactivator 24 to deactivate EAS element 35. Else, computer 12 may send a message to a store sales associate indicating that purchased item 45 does not match the item in image 42, as purchase receipt 43 does not show that customer 41 paid for item 30 in image 42.

Figure 6:
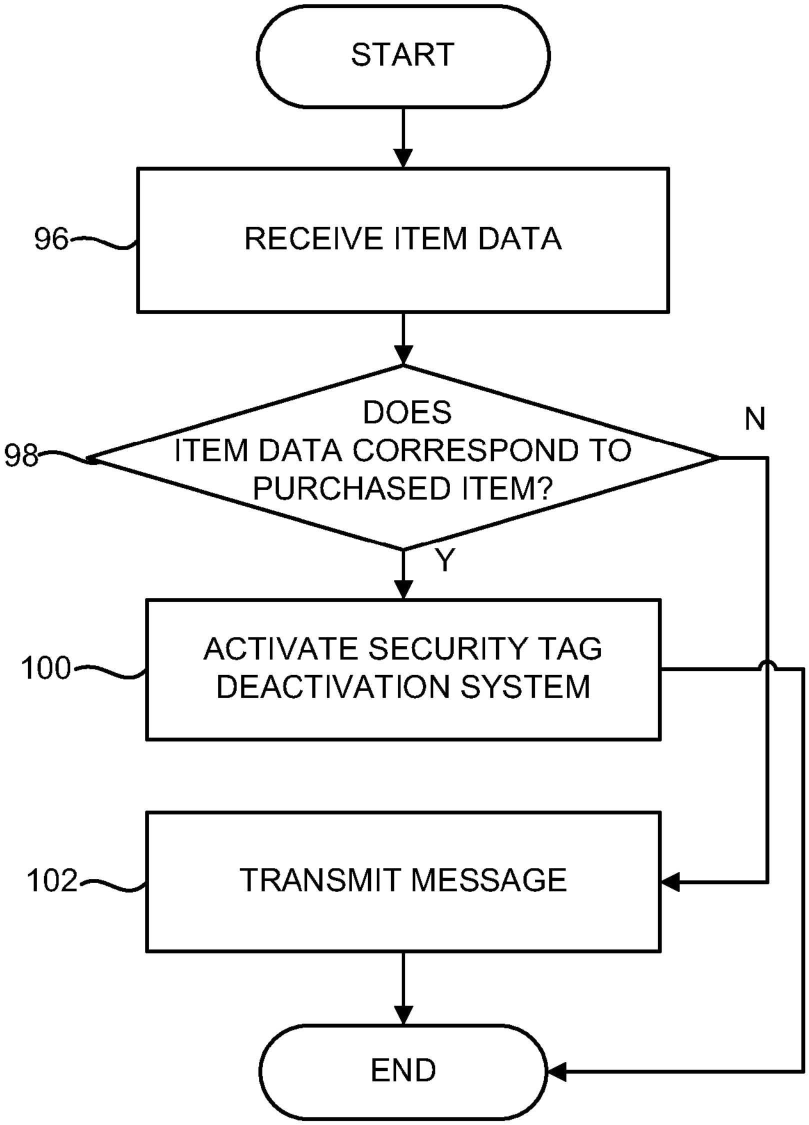
FIG. 6 is a flow chart of an exemplary process for activating an EAS element deactivator using item data in accordance with the principles of the present invention.

FIG. 6 is a flowchart of an exemplary process for activating EAS element deactivator 24 using item data. Item data is received (Block 96). Item data may include image 42. A determination is made as to whether the item data matches purchased item 45 in purchase receipt 43 (Block 98), i.e., whether image 42 matches purchased item 45. If image 42 matches purchased item 45, then EAS element deactivator 24 is activated (Block 100). Else, a message stating that purchased item 45 does not match image 42 is transmitted (Block 102). The message may be transmitted to security personnel.

In another exemplary embodiment, computer 12 may determine the item corresponding to the item data by searching item database 40. Computer 12 may query database 40 using item data, e.g., image 42, and/or image data obtained from image 42. For example, item information record 83*a* corresponding to item 30 may include item image 84*j*. Item image 84*j* may be an image of item 30, e.g., a television. As such, in this example, item image 84*j* includes the same item 30 that is shown in image 42.

Using visual analysis, computer 12 may determine that image 42 matches item image 84*j*, i.e., that item 30 in image 42 matches the item in item image 84*j*. Since item image 84*j* corresponds to item information record 83*a* of item 30, e.g., a television, computer 12 proceeds to determine whether purchased item 45 is a television, i.e., item 30. If computer 12 determines that purchased item 45 in purchase receipt 43 is item 30, computer 12 activates EAS element deactivator 24.

In another exemplary embodiment, computer 12 may determine the item in image 42 by obtaining image data from image 42 and using the image data to query item database 40 for a matching product. Using visual analysis, computer 12 may determine the size, measurements, length, width, color, etc. of the item in image 42. For example, computer 12 may determine that the determined size of the item in image 42 matches item size 84*h*, or that the determined dimensions of the item in image 42 match item dimensions 84*g*. Since the size and dimensions determined match item size 84*h* and item dimensions 84*g* corresponding to item information record 83*a* associated with item 30, computer 12 determines that the item in image 42 is item 30.

In another exemplary embodiment, item data, such as image data obtained from image 42, may match any item information record stored in item database 40. For example, computer 12 may compare item data with any information in item information record 83*a*. If computer 12 determines that the item data, e.g., image 42, matches information in item information record 83*a* of item 30, computer 12 may use information in item information record 83*a* to compare with purchased item 45. The comparison allows computer 12 to determine whether purchase receipt 43 shows that the determined item, i.e., item 30 in item database 40 which matches the item data, has been paid for.

For instance, computer 12 may compare item name 84*a*, or any information in item information record 83*a*, with purchased item 45. Computer 12 may examine purchase receipt 43 to determine whether purchased item 45 is the same as the item determined to match image 42. Purchased item 45 may include the name of the item, such as item name 84*a*, e.g., a "television." Computer 12 may compare item name 84*a* in item information record 83*a* with item name 84*a* in purchased item 45. If the determined item, e.g., item name 84*a*, matches purchased item 45, then computer 12 sends an activation signal to EAS element deactivation system 14 to activate EAS element deactivator 24.

Purchased item 45 in purchase receipt 43 may match or correspond to any information in item information record 83*a*, including but not limited to item name 84*a*, item description 84*b*, item shape 84*c*, item price 84*d*, item specifications 84*e*, item color 84*f*, item dimensions 84*g*, item size 84*h*, item brand 84*i*, item image 84*j*, item identification 84*k*, item length 84*l*, item width 84*m*, item location 84*n*, other item data 84*o*, item weight 84*p*, item tag data 84*q*, item tag information 84*r*, item tag SKU 84*s* and item barcode data 84*t*.

For example, in another exemplary embodiment, purchased item 45 in purchase receipt 43 may include an item identification, such as item identification 84*k*. Computer 12 may determine that item data, e.g., image 42, corresponds to item 30 associated with item information record 83*a*. Computer 12 verifies that purchase receipt 43 indicates that customer 41 paid for the item in image 42. Computer 12 may compare the item identification 84*k* in purchased receipt 43 with item identification 84*k* of item information record 83*a*, as purchased item 45 includes item identification 84*k*. If computer 12 determines that purchased item 45 matches item identification 84*k* corresponding to item 30, then computer 12 sends an activation signal to EAS element deactivator 24.

On the other hand, computer 12 may determine that purchased item 45 does not match the item data, e.g., image 42. If computer 12 determines that purchased item 45 does not match image 42, computer 12 denies the deactivation of EAS element 35. Computer 12 may also transmit a message for display on display 26 of EAS element deactivation system 14. The message may advise customer 41 that a store sales associate is on his/her way to assist with the transaction. Computer 12 may also transmit an assistance request message to the store sales associate. The message may inform the store sales associate that there is a discrepancy between purchased item 45 and the item data, e.g., image 42, and that the store sales associate should assist customer 41 with the deactivation of EAS element 35.

Figure 7:
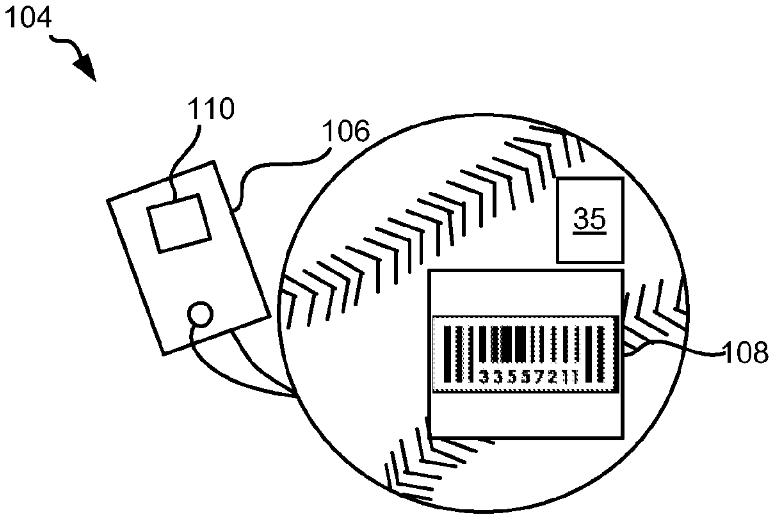
FIG. 7 illustrates an exemplary item in accordance with the principles of the present invention.

FIG. 7 is an illustration of exemplary item 104 associated with EAS element 35, tag 106 and manufacturer barcode 108. Tag 106 may include tag data 110. In an exemplary embodiment, a customer may switch tag 106 of item 104 with tag 28 of item 30. Customer 41 may wish to buy item 30, for example, a high definition flat screen television that costs $1,000.00. However, customer 41 may decide that item 30, i.e., the high definition flat screen television, is too expensive.

Customer 41 may find a much less expensive item, such as exemplary item 104. Item 104 may be a baseball that costs, for example $10.00. Tag data 110 may include the price of item 104, which is less than the price of item 30, e.g., the high definition flat screen television. Customer 41 may decide to switch price tag 28, associated with item 30, with price tag 106 associated with much less expensive item 104. After switching tag 28 with tag 106, customer 41 may pay using a self-checkout station, such as POS device 36.

Customer 41 may use POS device 36 to scan tag data 110. Customer 41 pays the amount indicated by tag data 110, i.e., the amount that the baseball costs, instead of paying the full price of item 30. Customer 41 may receive purchase receipt 43 including purchased item 45. Purchase receipt 43 indicates that item 104 was purchased. Purchased item 45 is item 104 since tag data 110 corresponds to item 104. Purchase receipt 43 does not indicate that item 30 was purchased, since customer 41 fraudulently associated tag 106 with item 30. Purchase receipt 43 may further indicate that customer 41 paid $10.00.

Customer 41 may then approach EAS element deactivation system 14 with item 30. Customer 41 may proceed to try to deactivate EAS element 35 attached to item 30. Camera 18 may take a picture/image 42 of item 30 and transmit image 42 to computer 12 for visual analysis. Computer 12 receives image 42 and using image analysis, computer 12 may determine that image 42 is a picture of item 30, i.e., a television. Computer 12 determines whether purchase receipt 43 shows that customer 41 paid for the item in image 42. Computer 12 may review purchase receipt 43 and determine that purchased item 45 is not a television, but instead item 104, which is a baseball. Computer 12 denies the activation of EAS element deactivator 24. Computer 12 may send a message to a store sales associate stating that the purchased item 45 does not match image 42.

In another exemplary embodiment, computer 12 may perform visual analysis on image 42 to determine image data including physical attributes of the item depicted in image 42.

For example, computer 12 may determine that image 42 shows item 30, which is a large squared item. Further, computer 12 examines purchase receipt 43 for a matching item, e.g., an item that is a large squared item. To do so, computer 12 may look up in item database 40 an item record information corresponding to purchased item 45, i.e., item 104. Once computer 12 finds the item information record corresponding to item 104, computer 12 may analyze the item information record. Computer 12 may determine that, according to the item record information corresponding to purchased item 45, i.e., item 104, purchased item 45 is a small round item.

Computer 12 may compare the "large squared item" description of item 30 with the "small round item" description in the item information record corresponding to purchased item 45, i.e., item 104. Since the item descriptions do not match, computer 12 determines that purchased item 45 does not match image 42. As such, computer 12 determines that the item in image 42, i.e., item 30, has not been paid for.

Since computer 12 determines that there is a discrepancy between image 42 and purchased item 45, computer 12 does not activate EAS element deactivator 24. Instead, computer 12 sends a message, such as an assistance request message or an alert message, informing a store sales associate that a customer is attempting to deactivate an item that was not paid for. The message may also state that purchase receipt 43 indicates that customer 41 paid for item 104 and not the item portrayed in image 42, i.e., item 30.

Figure 8:
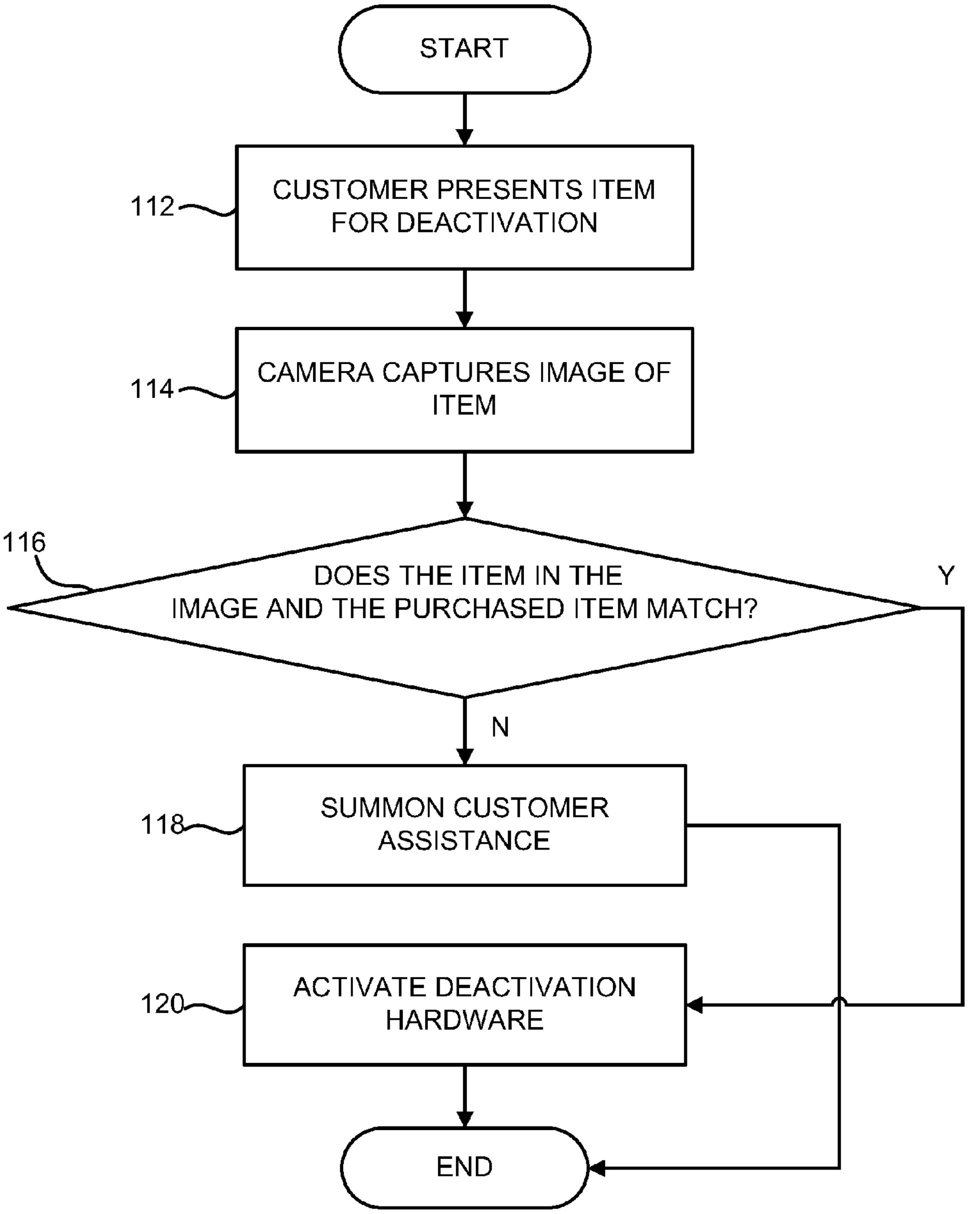
FIG. 8 is a flow chart of another exemplary process for activating an EAS element deactivator using an image of an item in accordance with the principles of the present invention.

FIG. 8 is a flowchart of another exemplary process for determining whether to activate EAS element deactivator 24 based on an analysis of image 42 of item 30. A customer presents item 30 for deactivation at EAS element deactivation system 14 (Block 112). Camera 18 captures image 42 of item 30 (Block 114). Computer 12 queries item database 40 to determine which item is depicted in image 42. A determination is made as to whether the image 42 matches the purchased item 45 in purchase receipt 43 (Block 116). If the item in image 42 matches purchased item 45, deactivation hardware is activated (Block 120). Else, a message is transmitted to summon customer assistance (Block 118).

In another exemplary embodiment, computer 12 may initiate a second level security process when image 42 does not match purchased item 45. For instance, when a customer brings item 30 for deactivation and computer 12 denies deactivation of EAS element 35, computer 12 may send a message to be displayed on display 26 of EAS element deactivation system 14. The message may request customer 41 to scan tag 28 and barcode 34 associated with the item presented for deactivation, i.e., item 30.

Customer 41 may scan tag 28 and barcode 34 using scanner 20. EAS element deactivation system 14 may transmit tag 28 and barcode 34 to computer 12. Computer 12 may receive tag 28 and barcode 34, and may determine whether barcode 34 corresponds to or matches tag 28. For example, barcode 34 may be compared to tag 28 to see if they match or correspond to the same item. If barcode 34 does not match tag 28, then computer 12 may send an assistance request message to a store sales associate so that the store sales associate may resolve the inconsistency. The message may state that tag data 32 in tag 28 does not correspond to or match barcode 34.

If barcode 34 matches tag 28, then computer 12 may send a message indicating that, while tag data 32 matches barcode 34, computer 12 was unable to verify whether purchase receipt 43 includes item 30. Further, if computer 12 determines that purchased item 45 in purchase receipt 43 does not match barcode 34 or tag data 32, computer 12 may send a message indicating that purchase receipt 43 does not show that the item corresponding to tag 28 and barcode 34, e.g., item 30, has been paid for. Alternatively, computer 12 may be configured to activate EAS element deactivation system 14 when either (i) barcode 34 matches purchased item 45 or tag data 32, or (ii) tag data 32 matches purchased item 45.

Computer 12 may determine whether barcode 34 matches purchased item 45 by comparing the item corresponding to barcode 34 with purchased item 45. Alternatively, computer 12 may query item database 40 to determine an item information record associated with purchased item 45, such as item information record 83*a*. Computer 12 may query item database 40 using barcode 34. Computer 12 may determine that item barcode data 84*t* in item information record 83*a* matches barcode 34. As such, computer 12 determines that item information record 83*a* corresponds to item 30 associated with barcode 34. Computer 12 may proceed to compare any information in item information record 83*a* with purchased item 45. For example, if purchased item 45 includes an item tag SKU 84*s*, computer 12 may compare the item tag SKU 84*s* in purchased item 45 with item tag SKU 84*s* in item information record 83*a*. If the item tag SKU 84*s* in purchased item 45 matches item tag SKU 84*s* of item information record 83*a*, then computer 12 determines that barcode 34 corresponds to and matches purchased item 45.

In another exemplary embodiment, item data received by computer 12 includes the weight of an item, such as item 30, presented for deactivation. Scale 22, which may be a solenoid type weight scale, weights item 30. Security deactivation system 14 sends item data, e.g., the weight of item 30, to computer 12. Computer 12 examines purchase receipt 43 and determines the weight of purchased item 45. Computer 12 compares the weight of item 30 presented for deactivation with the weight of purchased item 45.

If the weight of item 30 is the same as or approximately the same as the weight of purchased item 45, then computer 12 sends an activation signal to activate EAS element deactivator 24. Else, if the weight of item 30 is not approximately equal to the weight of purchased item 45, then computer 12 sends a message to a store sales associate. The message may indicate that the weight of the purchased item 45 is not the same as the weight of the item presented for deactivation.

To determine the weight of purchased item 45, computer 12 may query item database 40 using purchased item 45. Computer 12 may determine that item information record 83*a* corresponds to purchased item 45. Item information record 83*a*, includes item weight 84*p* of item 30. Computer 12 compares item weight 84*p* in item information record 83*a* and the weight of purchased item 45 calculated by scale 22. If the weights are within a predetermined amount, then computer 12 activates EAS element deactivator 24.

For example, if a customer switches tag 28 corresponding to item 30, e.g., a high definition flat screen television, with tag 106 corresponding to item 104, e.g., a baseball, and brings item 30 to EAS element deactivation system 14, scale 22 calculates the weight of item 30. EAS element deactivation system 14 transmits the calculated weight of item 30, which may be 100 pounds, to computer 12.

Computer 12 determines the weight of the actual purchased item 45, i.e., item 104. Computer 12 may determine the weight of purchased item 45 by querying item database 40 using purchased item 45. Computer 12 determines an item information record corresponding to purchased item 45. The item information record corresponding to purchased item 45 may include the weight of purchased item 45, which may be, for example, one pound.

Computer 12 compares the received weight of item 30, i.e., 100 pounds, with the weight corresponding to the actual purchased item 45, i.e., one pound. Since the weight of purchased item 45 is not approximately equal to the weight of the item presented for deactivation, i.e., it is not within a predetermined amount, computer 12 does not activate EAS element deactivator 24. Instead, computer 12 denies deactivation of item 30. Computer 12 may send a message to a store sales associate indicating that the weight of the item presented for deactivation does not match the weight of purchased item 45.

Figure 9:
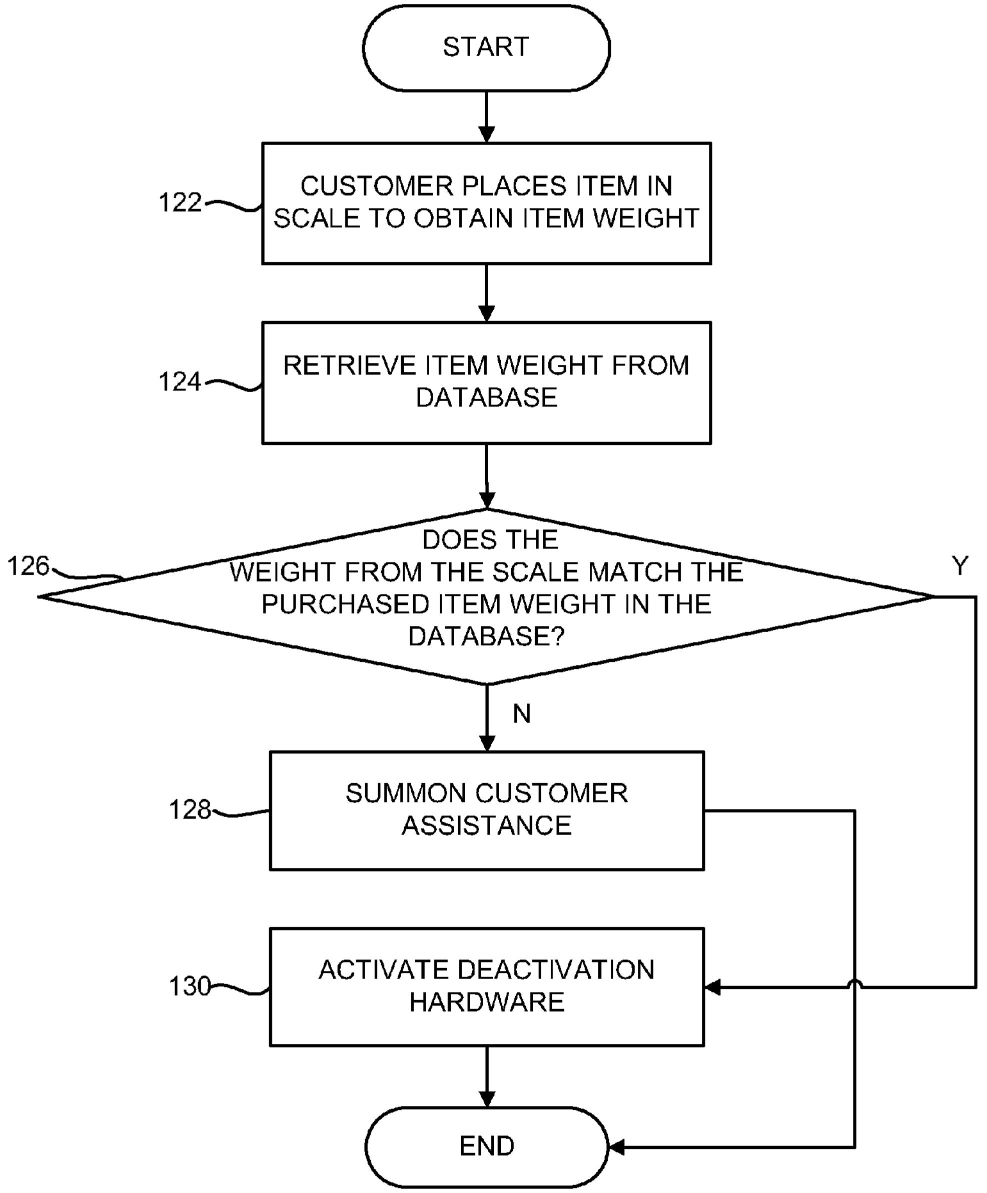
FIG. 9 is a flow chart of another exemplary process for activating an EAS element deactivator using a weight of an item in accordance with the principles of the present invention.

FIG. 9 is a flowchart of another exemplary process for determining whether to activate EAS element deactivator 24 based on the weight item 30. Scale 22 determines the weight of item 30 (Block 122). Computer 12 examines purchase receipt 43 to determine purchased item 45. The weight of purchased item 45 is retrieved from item database 40 (Block 124). A determination is made as to whether the weight of item 30 obtained from scale 22 matches the weight of purchased item 45 obtained from item database 40 (Block 126). If the weights match, then EAS element deactivator 24 is activated (Block 130). Else, a message is transmitted to summon customer assistance (Block 128).

In another exemplary embodiment, computer 12 and scanner 20 may be used to validate that item 30 matches tag 28. Scanner 20 may be used to scan manufacturer code 34 associated with item 30, such as a barcode. Scanner 20 may also be used to scan tag 28 to obtain tag data 32. EAS element deactivation system 14 may transmit barcode 34 and tag data 32 to computer 12. Computer 12 may determine whether tag data 32 corresponds to or matches the barcode 34. For example, computer 12 may determine whether a description or barcode data associated with barcode 34 matches tag data 32 by comparing barcode 34 with tag data 32. If tag data 32 matches barcode 34, i.e., both belong and correspond to the same item, then computer 12 sends an activation signal to activate EAS element deactivator 24. Else, computer 12 may send a message indicating that tag data 32 does not match barcode 34. Of note, this embodiment may be used as a second level security check when image 42 does not match purchased item 45 in purchase receipt 43, i.e., item 30 fails the image 42 validation.

In another exemplary embodiment, cameras, such as video cameras of a store's video system, may be positioned throughout the retail store. At least one camera, such as camera 18, may be used to track customers through the retail store. Computer 12 is in communication with camera 18 and may be configured to control camera 18. Camera 18 may also tract the items in the retail store and may take pictures/images of the items in the retail store. The pictures and images captured by camera 18 may be stored in item database 40, i.e., may be used to update pictures and images stored in item database 40.

In an exemplary embodiment, camera 18 may record which item has been picked up by a customer. By way of example, a customer may pick up item 30 from a shelf and may place item 30 in a shopper's basket or a shopping cart. Camera 18 may take an image 42 of item 30. Image 42 of item 30 may be sent to computer 12. Computer 12 may associate customer 41 with item 30, e.g., with image 42 of item 30. Computer 12 may identify item 30 depicted in image 42 by determining the location where item 30 was picked up by customer 41. The location may be identified using a planogram of the retail store, i.e., a visual diagram, or drawing, that provides in detail where items in a retail store are placed. A planogram may include a retail store's layout and show on which aisle and on what shelf an item is located. Additionally, item database 40 may include in item information record 83*a* information corresponding to the location of item 30, such as item location 84*n*. As another example, computer 12 may analyze image 42 to determine which part of the store is shown in image 42.

For example, POS device 36 may be a mobile POS device, such as a wireless mobile device that can be used by customer 41 to perform self-checkout at any location where item 30 is located, such as for example an aisle in the retail store. POS device 36 may be a handheld equipped with a mobile POS application. POS device 36 may be provided to customer 41 by the retail store or may be provided by customer 41, e.g., POS device 36 may be a mobile device of customer 41, the mobile device may be equipped with a retailer mobile POS application. Customer 41 may use POS device 36 to ring up the sale and scan tag 28, which includes a price. Customer 41 may, after ringing up the sale, walk to a deactivation station or self-checkout station in order to deactivate EAS element 35. Computer 12 may transmit an authorization to deactivate EAS element 35 to EAS element deactivator 24. The authorization to deactivate EAS element 35 may include data including a characteristic of a product associated with the price in tag 28, such as the size, shape and dimensions of the product matching the scanned price in tag 28. As such, customer 41 may purchase item 30 in the aisle of the store, and does not need to go to a self-checkout station to purchase item 30. EAS element deactivation system 14 may be a validation and deactivation station that validates the sale rang up by customer 41 or a sales associate using POS device 36. EAS element deactivation system 14 may validate the transaction rang up by customer 41 or a sales associate by, for example, verifying/validating that item 30 corresponds to the received characteristics of a product associated with the price in tag 28.

For instance, to pay for the item, customer 41 may scan tag 28, including tag data 32, using input device 38. Computer 12 may receive tag data 32 and determine whether tag data 32 matches image 42 associated with customer 41. For example, computer 12 may determine whether a price associated with tag 28 matches a price of item 30 in image 42. As such, item 30 is validated during the scanning of tag 28, e.g., at the time POS device 36 processes the transaction, by determining whether the price of the item scanned corresponds to image 42 of item 30.

If the price in tag 28 corresponds to the price of item 30 in image 42 associated with customer 41, then computer 12 activates EAS element deactivator 24. To match tag 28 with image 42, computer 12 may determine an item information record corresponding to item 30 in image 42, such as item information record 83*a*. Computer 12 may compare tag data 32 in tag 28 with information in item information record 83*a*.

In another exemplary embodiment, customer 41 may "checkout" and pay for item 30 when customer 41 picks up item 30 from a store shelf. For example, tag 28 may be scanned when customer 41 picks up item 30, and customer 41 may pay for item 30 on the spot, without having to use a checkout register located by an exit of the retail store. Customer 41 may then proceed to deactivate EAS element 35 at EAS element deactivation system 14, which may be located near an exit of the retail store.

Figure 10:
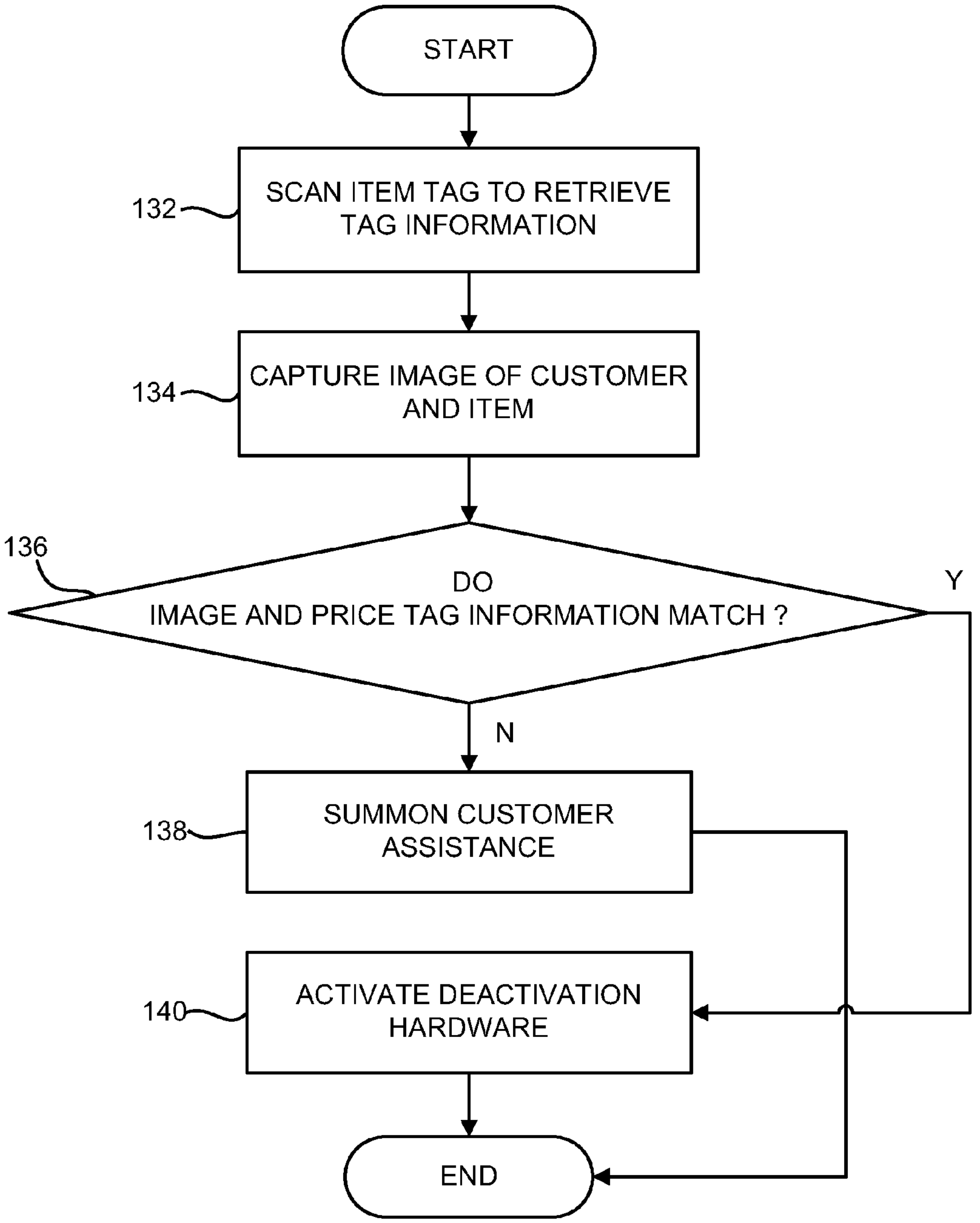
FIG. 10 is a flow chart of another exemplary process for activating an EAS element deactivator using an image of a tracked item in accordance with the principles of the present invention.

FIG. 10 is a flow chart of another exemplary process for activating EAS element deactivator 24 to deactivate a tracked item. Tag 28 associated with item 30 is scanned. Tag data 32 includes price information (Block 132). Camera 18 captures image 42 of the item customer 41 picked up, e.g., item 30 (Block 134). Customer 41 proceeds to EAS element deactivation system 14. A determination is made as to whether captured image 42 matches the price information on tag 28, i.e., whether the item in image 42 corresponds to the price information (Block 136). If the image matches the price on tag 28, i.e., the price of the item in image 42 is the price shown on tag 28, then EAS element deactivator 24 is activated (Block 140). Else, a message is sent to summon customer assistance (Block 138).

In another exemplary embodiment, a shopper may be authorized to use EAS element deactivation system 14 without supervision from a store sales associate. For example, a retailer may run a background check on customer 41 to determine whether customer 41 may be given the status of a trusted shopper, i.e., an honest customer. Computer 12 may store a list of trusted shoppers and their images. If computer 12 identifies customer 41 as a trusted shopper, then EAS element deactivation system 14 is activated.

In another exemplary embodiment, computer 12 may keep track of the time periods over which each denied deactivation event occurs. Camera 18 may be used to capture a facial image of customer 41 in the event a deactivation is denied. The image may be added to a report, which may be a virtual report accessible by retail loss prevention personnel. The report may also include information regarding the number of EAS elements 35 denied deactivation, the time period over which the denial occurred, and the types of products involved in tag switching. Over time, trends and averages may be established with respect to how attempts to deactivate tags are denied.

The facial image of customer 41 may be analyzed during a forensic investigation of potential retail fraud activity. In the case of a confirmed retail fraud event, the facial image may be shared with law enforcement personnel. The facial image may be used as evidence of fraud committed by a customer. The report may be retrieved via a data mining feature. For example, the report may be identified by a report number. A report database storing reports may be queried using the report number. Also, the report database may be queried for potential fraud activity on a given day or over a range of dates.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for activating an Electronic Article Surveillance ("EAS") element deactivator, the method comprising:
- receiving, at a computer, item data including a physical attribute of an item, the item being associated with a manufacturer code and a tag including tag data;
  - determining whether the item data corresponds to a purchased item in a purchase receipt; when it is determined that the item data corresponds to the purchased item:
  - activating the EAS element deactivator for use;
- when it is determined that the purchased item does not correspond to the item data then:
  - receiving the manufacturer code and the tag data;
  - comparing the manufacturer code and the tag data;
  - determining, based at least in part on the comparison of the manufacturer code with the tag data, whether the tag corresponds to the item; and
- if it is determined that the tag corresponds to the item, then:
  - transmitting a message indicating that the purchase receipt does not include the item;
- else,
  - transmitting a message indicating that the tag does not correspond to the item.

2. The method of claim 1, wherein the item data includes an image of the item, and wherein determining whether the item data corresponds to the purchased item further comprises:
- identifying the item in the image;
- determining whether the purchased item matches the item; and
- if it is determined that the purchased item matches the item, then:
  - establishing that the item data corresponds to the purchased item.

3. The method of claim 2, wherein the item is associated with a tag including tag data, the method further comprising:
- if it is determined that the purchased item does not match the item, then:
  - receiving the tag data;
  - determining whether the tag data corresponds to the image of the item; and
  - if it is determined that the tag data corresponds to the image of the item, then:
    - transmitting a message indicating that the purchase receipt does not include the item in the image;
  - else,
    - transmitting a message indicating that the tag data does not correspond to the item in the image.

4. A method for activating an Electronic Article Surveillance ("EAS") element deactivator, the method comprising:
- receiving a manufacturer code of an item, the item being associated with a tag;
- receiving tag data from the tag;
- comparing the manufacturer code with the tag data using a computer;
- determining, based at least in part on the comparison of the manufacturer code with the tag data, whether the tag corresponds to the item; and
- if it is determined that the tag corresponds to the item, then:
  - activating the EAS element deactivator for use; and
  - transmitting a message indicating that the tag corresponds to the item; and
- if it is determined that the tag does not correspond to the item;
  - transmitting a message indicating that the tag does not correspond to the item.

5. The method of claim 4, further comprising:
- if it is determined that the tag does not correspond to the item, then:
  - transmit a message indicating that the manufacturer code does not match the tag data.

6. A method for activating an Electronic Article Surveillance ("EAS") element deactivator, the method comprising:
- determining, by a computer, that an item was removed by a customer from a location in a retail store, the item being associated with a tag including tag data;
- identifying the item based at least in part on the location where the item was removed from;
- associating the item with the customer;
- determining whether the tag data corresponds to the item; and
- if the tag data corresponds to the item, then:
  - activating the EAS element deactivator for use.

7. The method of claim 6, wherein determining whether the tag data corresponds to the item further comprises:
- tracking the item through the retail store; and
- receiving the tag data.

8. The method of claim 7, wherein determining whether the tag data corresponds to the item further comprises:
- analyzing an image of the tracked item; and determining whether the tag data corresponds to the image of the item;

if the tag data corresponds to the image of the item, then:

establishing that the tag data corresponds to the item.

9. The method of claim 6, wherein the location is determined by using a planogram showing on which aisle and on what shelf an item was located.

10. A computer for activating an Electronic Article Surveillance ("EAS") element deactivator, the computer comprising:

a transmitter;

a receiver in communication with the transmitter, the receiver configured to receive item data including a physical attribute of an item, the item being associated with a manufacturer code and a tag including tag data;

a processor in communication with the receiver and the transmitter, the processor configured to determine whether the item data corresponds to a purchased item in a purchase receipt; and when the processor determines that the item data corresponds to the purchased item, the transmitter is configured to:

transmit an activation signal to activate the EAS element deactivator;

and when the processor determines whether the purchased item does not match the item data, then the receiver is further configured to:

receive the manufacturer code and the tag data; and the processor is further configured to:

compare the manufacturer code and the tag data;

determine, based at least in part on the comparison of the manufacturer code with the tag data, whether the tag corresponds to the item; and if the processor determines that the tag corresponds to the item, then the transmitter is further configured to:

transmit a message indicating that the purchase receipt does not include the item;

else, transmit a message indicating that the tag does not correspond to the item.

11. The computer of claim 10, wherein the item data includes an image of the item, and wherein determining whether the item data corresponds to the purchased item further includes:

identifying the item in the image;

determining whether the purchased item matches the item; and if the processor determines that the purchased item matches the item, then:

establishing that the item data corresponds to the purchased item.

12. The computer of claim 11, wherein the item is associated with a tag including tag data, and wherein if the processor determines that the purchased item does not match the item, then:

the receiver is further configured to receive the tag data;

the processor is further configured to determine whether the tag data corresponds to the image of the item; and if the processor determines that the tag data corresponds to the image of the item, then the transmitter is further configured to:

transmit a message indicating that the purchase receipt does not include the item in the image;

else, transmit a message indicating that the tag data does not correspond to the item in the image.

13. A computer for activating an Electronic Article Surveillance ("EAS") element deactivator, the computer comprising:

a transmitter;

a receiver in communication with the transmitter, the receiver configured to:

receive a manufacturer code of an item, the item being associated with a tag;

receive tag data from the tag; and a processor in communication with the transmitter and the receiver, the processor configured to:

analyze the manufacturer code and the tag data;

determine, based at least in part on the analysis of the manufacturer code and the tag data, whether the tag corresponds to the item; and if the processor determines that the tag corresponds to the item, then:

the transmitter is configured to:

transmit an activation signal to activate the EAS element deactivator for use; and transmit a message indicating that the tag corresponds to the item;

else;

the transmitter is configured to transmit a message indicating that the tag does not correspond to the item.

14. The computer of claim 13, wherein if the processor determines that the tag does not correspond to the item, then the transmitter is further configured to:

transmit a message indicating that the manufacturer code does not correspond to the tag data.

15. A system for activating an Electronic Article Surveillance ("EAS") element deactivator, the system comprising:

a computer, the computer including:

a transmitter; and a processor in communication with the transmitter, the processor configured to:

determine that an item was removed by a customer from a location in a retail store, the item being associated with a tag including tag data;

identify the item based at least in part on the location where the item was removed from;

associate the item with the customer;

determine whether the tag data corresponds to the item; and if the processor determines that the tag data corresponds to the item, then the transmitter is configured to:

transmit an activation signal to activate the EAS element deactivator for use.

16. The system of claim 15, the system further comprising:

a camera in communication with the computer, the camera including:

a camera imager, the camera imager configured to:

track the item through the retail store; and capture an image of the tracked item; and a camera transmitter in communication with the camera imager, the camera transmitter transmitting the image of the tracked item to the computer;

the computer further comprising:

a receiver in communication with the processor and the transmitter, the receiver configured to receive the tag data and the image.

17. The system of claim 16, wherein determining whether the tag data corresponds to the item further comprises:

analyzing the image of the tracked item; and determining whether the tag data corresponds to the image;

if the processor determines that the tag data corresponds to the image, then the processor is further configured to:

establish that the tag data corresponds to the item.

18. The system of claim 15, wherein the location is determined by using a planogram showing on which aisle and on what shelf an item was located.

* * * * *